UNITED STATES PATENT OFFICE.

WILBUR CLARK KNOWLTON AND HARRY A. HOFFMAN, OF AKRON, OHIO, ASSIGNORS TO THE B. F. GOODRICH COMPANY, OF NEW YORK, N. Y., A CORPORATION OF NEW YORK.

COMPOUNDING RUBBER WITH POWDERY SUBSTANCES.

1,286,024. Specification of Letters Patent. Patented Nov. 26, 1918.

No Drawing. Application filed August 28, 1917. Serial No. 188,598.

*To all whom it may concern:*

Be it known that we, WILBUR CLARK KNOWLTON and HARRY A. HOFFMAN, citizens of the United States, residing at Akron, in the county of Summit and State of Ohio, have invented certain new and useful Improvements in the Art of Compounding Rubber with Powdery Substances, of which the following is a specification.

This invention relates to the art of compounding a plastic gum such as rubber, requiring considerable mastication for its incorporation with filling materials, with substances such as gas-black (a species of lampblack produced from natural gas) normally existing as an impalpable powder, our object being to keep the atmosphere in the vicinity of the mixing mill substantially free from the dust or powder, thus preventing waste and enhancing the comfort of the operatives. Instead of using the lampblack in its natural condition, we prepare and treat the fine powder so as to cause its concretion into friable grains or small lumps, dry and substantially free from dust, and in this form incorporate it with the rubber on the roller mill or in any suitable masticating apparatus heated in the usual way to soften the rubber, the friability of the lumps or grains permitting a uniform distribution of the filler throughout the rubber. We may use water or other volatile liquid alone as a concreting agent, first mixing enough of it with the lampblack to produce the desired condition, and then drying the mass before mixing it with the rubber, or we may use a liquid binder composed of water and a small quantity of a soluble agglutinant such as glue, starch, dextrose or sugar, or some binder insoluble or only partly soluble in water, but miscible therewith and having a tendency to hold the particles of the material together in the desired form, the binder remaining in the lampblack after evaporation of the water but not being present in sufficient quantity injuriously to affect the qualities of the rubber compound.

By way of example, we may take by weight, 240 parts of lampblack, 1000 parts of hot water and 5 parts of starch, the starch being first dissolved in the water and the solution then thoroughly mixed with the lampblack, after which the resulting paste or syrup is dried in shallow evaporating pans and the material is then ready for use. These proportions, however, may be varied within rather wide limits.

We do not claim broadly the granulation of the powder with a volatile liquid before mixing with the rubber, our invention being an improvement upon the process of that nature described in application of William C. Geer, Serial No. 100,153, filed May 26, 1916.

We claim:

1. The method of compounding a plastic substance with an impalpable powder which consists in causing a concretion of the powder into dry, granular or lumpy form, and then mixing it with the plastic substance.

2. The method of compounding rubber with a substance normally existing as an impalpable powder which consists in wetting the powder and drying it to produce a friable, granular or lumpy condition, and incorporating the dry, granular substance with the rubber.

3. The method of compounding rubber with lampblack which consists in wetting the powdered lampblack to concrete it, and drying the same, bringing it to a condition of friable grains or lumps, and incorporating the dry, granular lampblack with the rubber on a heated mixing mill.

4. The method of compounding rubber with lampblack which consists in mixing the lampblack with water, evaporating the water, leaving the lampblack in a granular or lumpy condition, and then mixing it with the rubber.

5. The method of compounding a plastic substance with an impalpable powder which consists in mixing the powder with a concreting and binding liquid, drying the same, producing a condition of friable grains or lumps, and mixing it with the plastic substance.

6. The method of compounding rubber with lampblack which consists in mixing the lampblack with water and a binder, evaporating the water, producing a condition of friable grains or lumps, and mixing said grains or lumps with the rubber.

7. The method of compounding rubber with lampblack which consists in mixing the lampblack with water and a binder, producing a granular condition, evaporating the water, and incorporating the dry, granular lampblack with rubber on a heated mixing mill.

In testimony whereof we have hereunto set our hands this 24th day of August, 1917.

WILBUR CLARK KNOWLTON.
HARRY A. HOFFMAN.